United States Patent
Lefevre et al.

(10) Patent No.: US 8,739,225 B2
(45) Date of Patent: May 27, 2014

(54) ALTERNATIVE AUDIO DELIVERY FOR TELEVISION VIEWING

(75) Inventors: Chad Andrew Lefevre, Indianapolis, IN (US); Martin Vincent Davey, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 18 days.

(21) Appl. No.: 13/805,820

(22) PCT Filed: Jul. 19, 2010

(86) PCT No.: PCT/US2010/002030
§ 371 (c)(1),
(2), (4) Date: Dec. 20, 2012

(87) PCT Pub. No.: WO2012/011887
PCT Pub. Date: Jan. 26, 2012

(65) Prior Publication Data
US 2013/0093952 A1    Apr. 18, 2013

(51) Int. Cl.
*H04N 5/445*   (2011.01)
*G06F 13/00*   (2006.01)
*G06F 3/00*    (2006.01)

(52) U.S. Cl.
USPC .................. 725/59; 725/93; 725/94; 725/95; 725/146

(58) Field of Classification Search
USPC ....................... 725/93–95, 146, 59
See application file for complete search history.

(56) References Cited

U.S. PATENT DOCUMENTS

| | | | |
|---|---|---|---|
| 6,710,815 B1 | 3/2004 | Billmaier et al. | |
| 7,471,677 B2 | 12/2008 | Deshpande | |
| 2006/0156374 A1 | 7/2006 | Hu et al. | |
| 2007/0250597 A1 * | 10/2007 | Resner et al. | 709/218 |
| 2010/0011405 A1 | 1/2010 | Wu | |
| 2010/0058430 A1 | 3/2010 | Jones et al. | |

FOREIGN PATENT DOCUMENTS

EP    1791130    5/2007

OTHER PUBLICATIONS

Harald,G et al: "Virtual Internet Broadcasting", IEEE Communications Magazine, IEEE Service Center, Piscataway, NJ, US, vol. 39, No. 6, Jun. 1, 2001, pp. 182-188.
Meandzija, B.: "Manageability of Java-Based Digital TV Receivers", IEEE Journal on Selected Areas in Communications, IEEE Service Center, Piscataway, NJ, vol. 18, No. 5, May 1, 2000.
Sport Sync AM/FM rADIO with Audio Delay: Internet Advertisement available via internet adress http://www.sportssyncradio.com/.
Delay Play: Internet Advertisement. Product available via internet address http://www.scannermaster.com/DelayPlay_p/01-561344.htm.

* cited by examiner

*Primary Examiner* — Hunter B Lonsberry
(74) *Attorney, Agent, or Firm* — Robert D. Shedd; Robert B. Levy

(57) ABSTRACT

A viewer viewing audio-visual content on an audio-visual display (12) advantageously can receive information as to potential sources of alternative audio (241-24n) via a set-top box (14). The set-top-box collects metadata identifying the audio-visual content viewed by the viewer and provides that metadata to a database (26) that searches for and identifies to the set-top-box the source(s) of alternative audio-if any. The set-top box will alert the viewer who can then select one of the identified sources of alternative audio in place of the audio embedded in the currently viewed audio-visual content.

15 Claims, 2 Drawing Sheets

ALTERNATIVE AUDIO DELIVERY FOR TELEVISION VIEWING

TECHNICAL FIELD

This application claims the benefit, under 35 U.S.C. §365 of International Application PCT/US2010/002030, filed Jul. 19, 2010 which was published in accordance with PCT Article 21(2) on Jan. 26, 2012.

BACKGROUND ART

Presently, television programming, whether received over the air or via cable or Internet, includes audio information corresponding to the video content. Indeed, in most instances, the only audio information available comprises the audio broadcast with the video content. However, in certain circumstances, alternative audio sources exist. For example, consider a sporting event such as a baseball game broadcast by a television network to a nationwide audience. In addition to the television network broadcasting the game, one or more local radio stations will broadcast the same game but will employ different announcers. The content from the radio station will contain details of the game just as the audio content from the television broadcast. However the content broadcast from the radio station typically will differ based on the difference in style, mannerism and personality of the announcer(s). For example, a radio station whose announcers regularly cover baseball games played by their local team will certainly have a different perspective than an announcer for a television network that covers many different teams.

Sports fans that regularly follow their home team often prefer the audio content from their local radio station as compared to the audio content accompanying a network television broadcast. Thus, some sports fans will watch the television broadcast with the volume on their television set turned off and tune a radio to receive the audio from their local radio station broadcasting the game. Indeed, some manufacturers provide special devices for adjusting the delay between the television and radio station broadcasts.

This approach to receiving alternative audio incurs several serious flaws. Depending on the quality of the radio receiver used by the viewer, the quality of the audio can suffer. Moreover, if the viewer is out of range of reception of the local radio station broadcasting the game, the viewer will not have an alternative source of audio content.

Thus a need exists for enabling a television viewer to identify and receive alternative audio that overcomes the aforementioned disadvantages.

BRIEF SUMMARY OF THE INVENTION

Briefly, in accordance with, a preferred embodiment of the present principles, a method for providing alternative audio to a viewer viewing an audio-visual content commences by first identifying the audio-visual content viewed by the viewer. In accordance with the identity of the viewed program, a search occurs to locate alternative audio. The alternative audio is selected for playout in place of audio associated with the audio-visual content.

DETAILED DESCRIPTION

Figure 1:
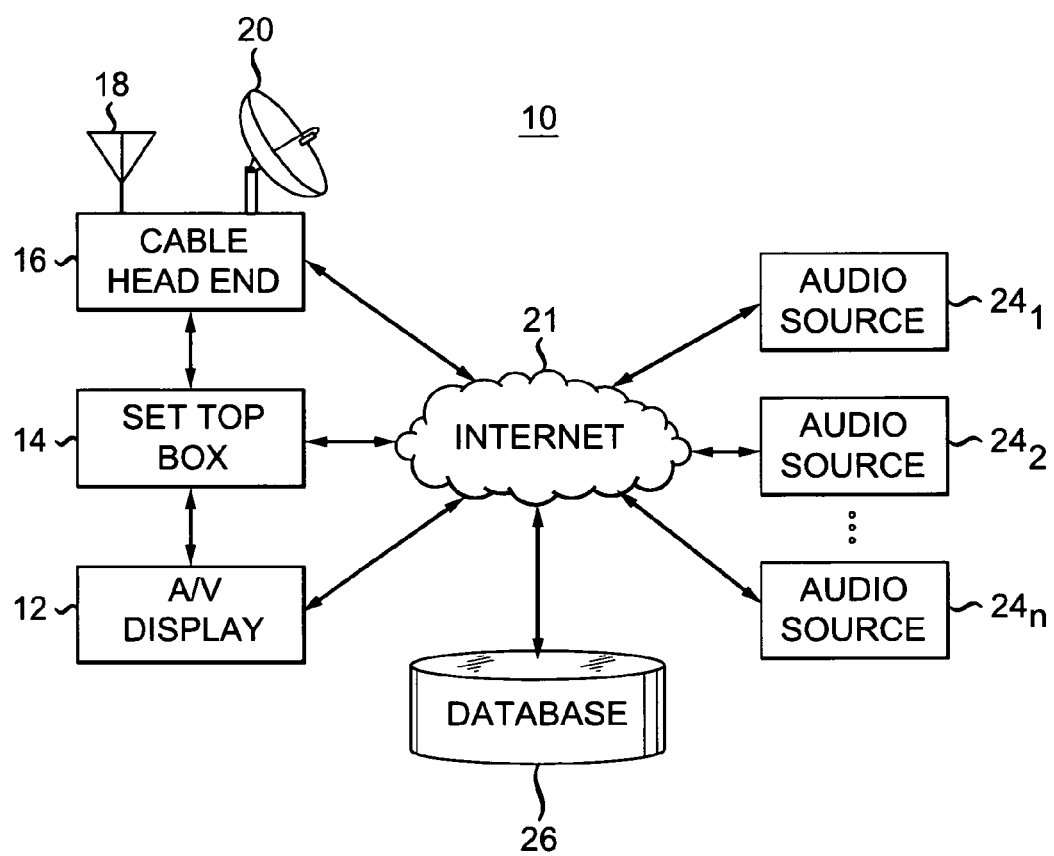
FIG. 1 depicts a system in accordance with a preferred embodiment of the present principles for providing a viewer of an audio-visual content with alternative audio.

FIG. 1 depicts a system 10 for delivering alternative audio to a viewer viewing audio-visual content (e.g., a television program) on an audio-visual display device 12, such as a television set. The system 10 typically includes a set top box 14 which accesses audio-visual content from a cable head end 16 to supply that content to the audio-visual display device 12. The cable head end 16 obtains audio-visual content from a variety sources, such as at least one a terrestrial broadcast station via an antenna 18, and/or at least one satellite broadcaster via a satellite receiver 20. The cable head end 16 can also receive audio-visual content from other sources as well, including the Internet 21 and/or one or more proprietary networks (not shown).

The structure and operation of the audio-visual display 12, the set-top box 14 and the cable head end 16 are well known in the art, and, except as described below, the details of these mechanisms do not affect the alternative audio delivery technique of the present principles. For example, the functionality of the set-top box 14 with regard to accessing audio-visual content from the cable head end 16 for supplying such content to the audio-visual display 12 could be performed by the audio-visual display itself. Indeed, the audio-visual display 12 could acquire audio-visual content directly from one or more terrestrial television broadcasters (not shown), without the need for the cable head end. Other mechanisms exist for providing audio-visual content to the audio-visual display 12.

The audio-visual content displayed by the audio-visual display 12 typically includes audio embedded within the video content as part of the process of creating the audio-visual content. For example, consider a sporting event, such as a baseball game broadcast by a television network and received by the cable head 16 of FIG. 1. A viewer wanting to view this sporting event on the audio-visual display 12 would tune the set-top box 14 to acquire the audio-visual content associated with the sporting event from the cable head end 16. The audio-visual content associated with the sporting event will contain video and embedded audio, both produced by the television network broadcasting the sporting event.

In some instances, a viewer might prefer to receive audio associated with the sporting event from a source different than the television network which originated the audio-visual content. For example, the viewer might prefer to receive audio from a local radio station also broadcasting the sporting event. In the past, a viewer seeking such alternative audio would tune a portable radio receiver to the radio station broadcasting the sporting event, while muting the audio output by the audio-visual display 12. Typically, the viewer will know the frequency of the radio station providing the audio broadcast of the sporting event in advance, thus enabling the viewer to tune the radio receiver.

This approach to obtaining alternative audio, while effective, incurs several drawbacks. First, the audio quality produced by many portable radio receivers does not compare to the high quality audio available on present day audio-visual displays. Secondly, while a viewer might know of one radio station broadcasting audio content associated with the sporting event, other radio stations might also broadcast the same sporting event. Thus, a viewer could have the choice of more than one source of alternative audio if the view knew of all of the radio stations broadcasting the sporting event.

In the accordance with the present principles, a viewer of an audio-visual content can select among one or more sources of alternative audio without incurring the aforementioned disadvantages. The alternative audio delivery technique of the present principles makes use of the Internet 21 to obtain alternative audio selected from among one or more audio sources $24_1$-$24_n$ where n is an integer greater than zero. In practice, the audio sources could comprise Internet radio stations, each associated with a corresponding terrestrial radio broadcaster. Presently, most terrestrial radio broadcast stations make their live broadcasts available over the Internet, thus giving rise to a plethora of Internet Radio Stations.

Each of the audio sources $24_1$-$24_n$ will have a Uniform Resource Locator (URL) to identify that source and facilitate a connection thereto. In some instances, the URL identifying a particular Internet radio broadcaster will lack notoriety and will not always reflect the radio frequency or even the call signal corresponding to the with associated terrestrial radio broadcaster. Thus, a television viewer seeking alternative audio might not know the appropriate URL to access the appropriate one of audio sources $24_1$-$24_n$, which broadcasts the same sporting event being viewed on the audio-visual display device.

To overcome this difficulty, the alternative audio delivery system 10 includes a database 26 coupled to Internet 21 for storing information that identifies available alternative audio sources, if any, for a given audio-visual content. In this regard, the audio-visual content obtained by the cable head end 16 will have associated metadata identifying the audio-visual content. As described hereinafter with respect to the flowchart of FIG. 2, when a viewer tunes the set-top box 14 to receive specific audio-visual content in the form of a television program associated with a sporting event, the set-top box 14 of FIG. 1 will access the Internet 21 to connect to the database 26. Upon connecting to the database 26, the set-top box 14 will provide the metadata identifying the audio-visual content selected by the viewer. In turn, the database 26 will search its stored information to identify which if any of the alternative audio sources $24_1$-$24_n$ contains corresponding alternative audio content for the identified audio-visual content. Upon searching its stored information and finding a match between the identity of the audio visual content and the audio content available on a particular one of the alternate audio sources $24_1$-$24_n$, the database 26 notifies the set-top box 14. In turn, the set-top box 14 alerts the viewer via the audio-visual display 12 to enable the viewer to select the desired alternative audio source.

In the event that the audio-visual display 12 has the ability to access audio-visual content without the need for the set-top box 14, then the audio-visual display would access the database 26 in the manner described to search for possible alternative audio sources. While FIG. 1 depicts the database 26 as lying outside of the set-top box 14 and the audio-visual display 12 in FIG. 1, the database 26 could reside within either of these elements. However, maintaining the database 26 independently of the set-top box 14 and the audio-visual display 12 enables updating of the database with no involvement by the set-top box and the audio-visual display.

Figure 2:
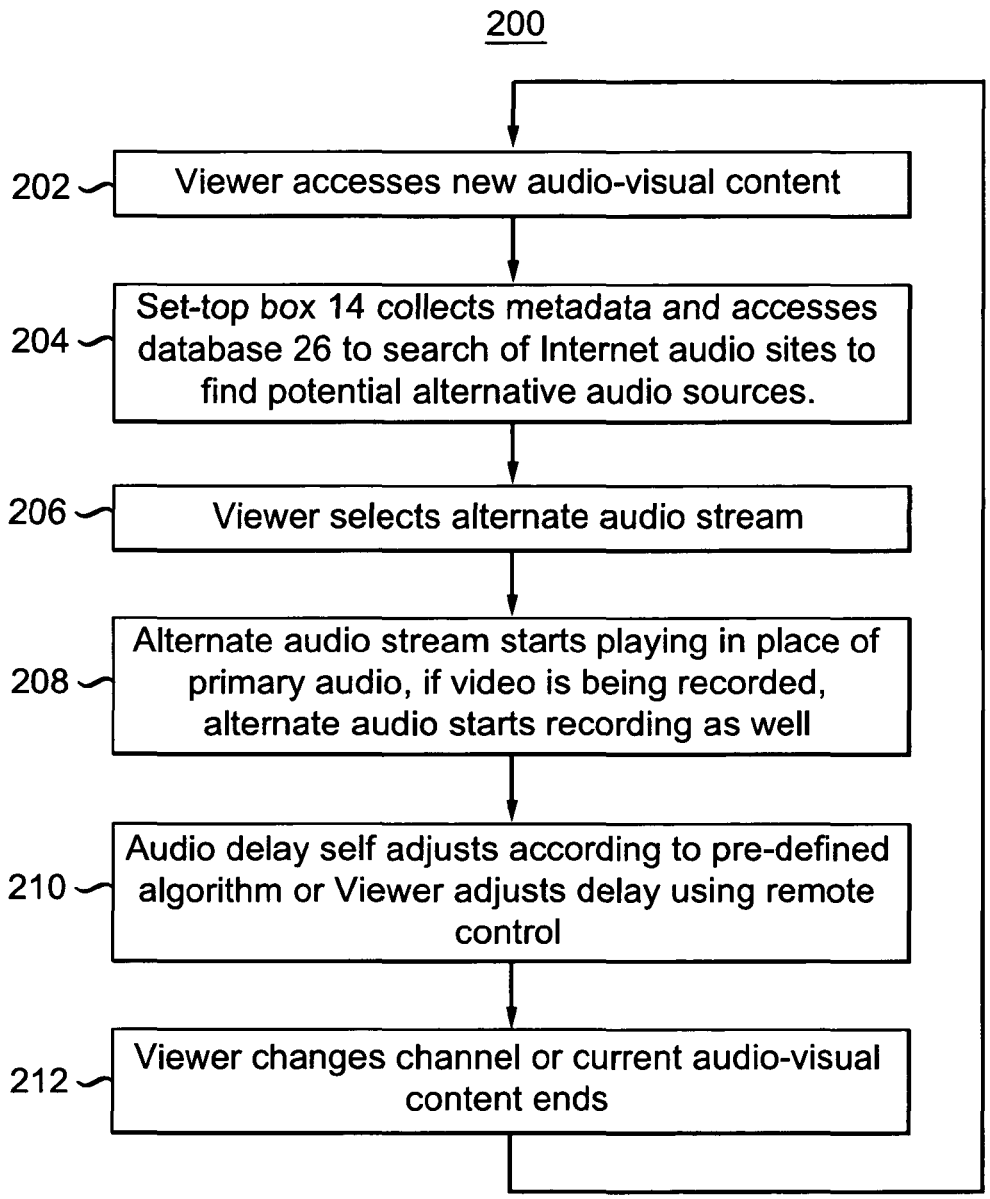
FIG. 2 depicts in flow chart form the steps of a method for operating the system of FIG. 1 to provide the alternative audio.

FIG. 2 depicts in flow chart forms the steps associated with a method 200 for alternative audio selection. The method 200 in FIG. 2 commences in step 202 when the viewer accesses new audio-visual content as occurs when the viewer tunes a different channel on the set-top box 14 of FIG. 1 or new audio-visual content (e.g., a new television program) appears on the current channel. Next, during step 204 the set-top box 14 collects metadata identifying the audio-visual content accessed by the viewer during step 202. The set-top box 14 then accesses the database 26 to search for and identify which if any of the alternative audio sources $24_1$-$24_n$ broadcasts audio corresponding to the audio embedded within the identified audio-visual content viewed by the viewer. Assuming that the database 26 has located at least one of the alternative audio sources $24_1$-$24_n$ broadcasting corresponding audio, the set-top box will alert the view of the availability of such alternative audio, typically by inserting display information.

The viewer can then select the alternative audio source during step 206, whereupon, the alternative audio stream commences playout during step 208 in place of the audio embedded within the audio visual content accessed for viewing during step 202. If the viewer has selected to record the audio-visual content, the alternative audio gets recorded, typically along with the audio embedded within the audio visual content accessed for viewing. To the extent that any delay exists between the alternative audio and the video of the audio visual content accessed for viewing, the set-top box will automatically adjust the audio according to a pre-determined algorithm during step 210. Alternatively, the viewer can adjust the delay during step 210 using a remote control (not shown) controlling the set-top box.

Should the viewer change the channel to access new audio-visual content, or should the current audio-visual content end, then step 202 and those following get re-executed.

The method 200 of FIG. 2, although discussed with respect to set-top box 14 of FIG. 1, could be practiced by the audio-visual display 12 when the display directly accesses audio-visual content, rather than doing so through the set-top box.

The foregoing describes a technique for providing a viewer of audio visual content with alternative audio.

The invention claimed is:

1. A method for providing alternative audio to a viewer viewing audio-visual content, comprising the steps of:
   identifying the audio-visual content viewed by the viewer;
   searching for alternative audio in corresponding to the identified audio-visual content viewed by the viewer; and
   selecting alternative audio for playout in place of audio associated with the audio-visual content while video associated with the identified audio-visual content simultaneously plays out.

2. The method according to claim 1 further comprising the steps of alerting the viewer of the alternative audio;
   receiving a selection request by the viewer to select the alternative audio content.

3. The method according to claim 1 further comprising the step of adjusting for delay between the alternative audio and video within the audio-visual content.

4. The method according to claim 3 wherein the step of adjusting is performed automatically.

5. The method according to claim 3 wherein the step of adjusting is performed in response to a viewer instruction.

6. The method according to claim 1 wherein the step of searching for alternative audio comprising the step of searching for Internet audio sites.

7. The method according to claim 1 further comprising the step of alerting the user of no available audio content instead of selecting alternative audio content when the search for alternative audio content fails to locate such alternative content.

8. The method according to claim 1 further comprising the step of ceasing playout of the alternative audio content when the viewer ceases viewing the audio-visual content.

9. The method according to claim 1 wherein the step of identifying the audio-visual content viewed by the viewer further comprises the step of examining metadata accompanying the audio-visual content.

10. The method according to claim 1 further comprising the step of recording the alternative audio.

11. The method according to claim 1 further comprising the step of recording the alternative audio along with the audio embedded in the audio-visual content.

12. A system for providing alternative audio to a viewer viewing audio-visual content on an audio-visual display device, comprising means for collecting metadata identifying the audio-visual content viewed by the viewer and for establishing a link to a data base responsive to the collecting means for identifying sources of alternative audio in accordance with the metadata identifying the audio-visual content viewed by the viewer; and means for establishing a link between the audio-visual display and an alternative audio source identified by the database so the viewer can receive the alternative audio while video associated with the identified audio-visual content simultaneously plays out.

13. The system according to claim 12 wherein the means for collecting metadata and the means for establishing a link collectively comprise a set-top box.

14. The system according to claim 12 wherein the means for establishing a link further records the alternative audio.

15. The system according to claim 12 wherein the means for establishing a link further records the alternative audio along with the audio embedded in the audio-visual content.

\* \* \* \* \*